Dec. 12, 1967  S. C. PANDOLFO III  3,357,301

INDEX LOCATION SYSTEM FOR MICROFILM

Filed Nov. 23, 1964

INVENTOR.
Sam C. Pandolfo III
BY Van Valkenburgh & Lowe
Attorneys.

United States Patent Office 3,357,301
Patented Dec. 12, 1967

3,357,301
INDEX LOCATION SYSTEM FOR MICROFILM
Sam C. Pandolfo III, Denver, Colo., assignor to General Publishing Corporation, Denver, Colo., a corporation of Colorado
Filed Nov. 23, 1964, Ser. No. 413,092
4 Claims. (Cl. 88—24)

ABSTRACT OF THE DISCLOSURE

A visual index location system for microfilm, wherein markings on alternate, secondary frames produce a shadow when the microfilm is rapidly moving through a reader, index indications being accomplished by an edge of the shadow being associated with an index marking at the side of the microfilm reader.

The system uses an apparatus for simultaneously photographing an indexed data sheet on a primary frame and the index indication on an adjacent secondary frame. The gage strip is transversely shiftable with respect to the sheet and secondary frame to correlate its position with the proper indexing position of the primary data sheet.

---

This invention relates to index location systems, and more particularly to an improved index location system which is especially adapted to be used in connection with microfilm reading apparatus. As such, the invention will be called a method and apparatus for index location microfilm webs, and will be sometimes herein referred to as an "index location system for microfilm" and sometimes simply as a "location system."

The present invention was conceived and developed to better meet the need for quick index location in certain types of microfilm reading operations. In the operation contemplated, the frames of microfilm web are arranged in an alphabetical order, but with a large number of adjacent, individual frames carrying material indexed under a common letter or number. The specific operation involves stock quotations which are originally listed in alphabetical array on a number of typed pages which might be conveniently joined together as a continuous web if modern high-speed line-printing apparatus is used. Each page is photographed on the microfilm to constitute a frame on the film web, and the information of many pages is on a single web of film. The film may be shown in a standard type of microfilm reader. There may be as many as 30,000 different stock quotations printed in a day on approximately 500 pages or frames which require a web length of as much as 30 feet. This web can be carried on a standard four-inch microfilm reel.

The use of this information involves the selection of one quotation, and it is obvious that any series of quotations, as for various clients, necessarily involves selections in a random manner. Accordingly, when a microfilm reel containing many frames of quotations is placed in a reading device, high-speed winding and rewinding controls in the reading device are desirable to locate the approximate position of the frame carrying the information desired. Subsequently, slow-movement-controls of the microfilm reader permit the film to move the proper frame into position.

The present invention comprises, in essence, a modification of the film into information-carrying primary frames and index-indicating secondary frames. It involves also a minor modification of a conventional microfilm reader to facilitate quick location of a selected group of commonly indexed frames, as will be hereinafter set forth. It involves further, a modification to photographing apparatus to permit this to be done without special complicated procedures.

A primary object of the invention is to provide a novel and improved indexing means on a web of microfilm having information carried on the frames thereof in an alphabetical sequence or any like sequence which may be indexed.

Another object of the invention is to provide a novel and improved method of carrying information on the frames of a microfilm strip, including primary information arranged in an indexed sequence and secondary information adapted to permit quick location of any selected portion of the primary information while on the film, as it is being rapidly moved through a microfilm reader.

A further object of the invention is to provide a novel and improved signaling means on a microfilm strip, which is visually projected onto the screen of a microfilm reader when the film is being rapidly moved through the reader, as during a wind or rewind operation, but which does not interfere with regular use of the microfilm when a frame is being projected on the viewing screen of the reader.

A further object of the invention is to provide a microfilm index location system which involves simple steps to prepare, is easy to use, is substantially fool-proof and involves a minimum of expense in preparing the film and modifying standard microfilm reading apparatus to accommodate the invention.

With the foregoing and other objects in view, all of which more fully hereinafter appear, my invention comprises certain constructions, combinations and arrangements of parts and elements, and selected operations and sequences of steps, as hereinafter described, defined in the appended claims and illustrated and exemplified in the accompanying drawing, in which:

FIGURE 1 is a perspective view of a microfilm reader of a conventional type which may be adapted for use with the present invention, the view illustrating in broken lines the extension of microfilm between its carrier reels and the manner in which the viewing field of the reader is partially obscured to indicate the index location of the projected film as it is being rapidly wound to and from a reel as, for example, during a rewind operation.

Figure 1:
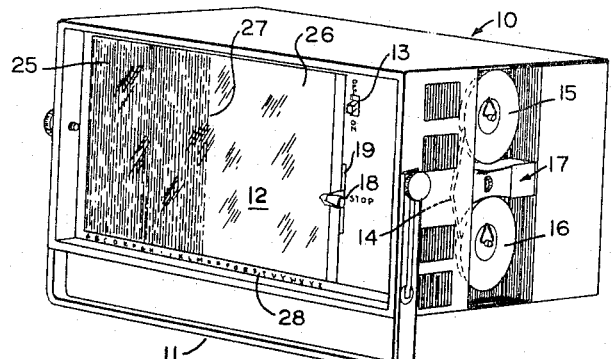

Referring more particularly to the drawing, FIG. 1 represents a conventional microfilm reader 10, which is formed generally as a box-like structure, carried upon supports such as 11, to present a viewing screen 12. The unit is operated electrically as from a suitable cord extended to a power source, not shown, and it is turned on and off by a switch 13, as illustrated. A microfilm web 14 is carried between two reels 15 and 16 located at each side of the lens of an optical system 17. The reels are positioned at one side of the reader 10 for convenient mounting and removal of the reels to and from the apparatus.

The reels are adapted to rotate together to pay the film web 14 from one reel to the other and back to permit various frames to be viewed upon the screen. This rotative action is controlled by a directional lever 18, suitably positioned on the front panel of the reader in a slot 19 adjacent to the viewing screen. Operation of the reels by the lever 18 is conventional, with the off position being at the center of the slot and with forward and reversing movements of the reels and web being by either up or down movements of the lever 18 within the slot 19, from the central "off" position. In a conventional arrangement, a slight movement of the lever from the central position effects a slow winding and unwinding of the web onto and from the reels while a full movement of the lever to an end of the slot 19, causes the winding and unwinding action to occur at full speed. With the slow movement, individual frames may come into view and be examined without difficulty, however, with fast movement, by full deflection of the lever in the slot, the frames appear to the reader as a blur.

Figure 2:
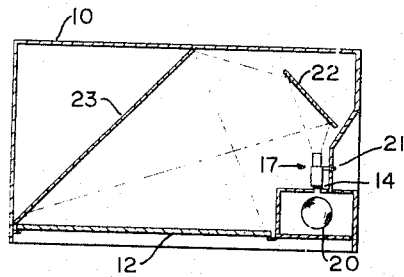
FIGURE 2 is a diagrammatic sectional plan view of the reader shown at FIG. 1 to illustrate the optical system therein, and the manner in which a frame on a microfilm web is projected to the reading screen.
Figure 3:
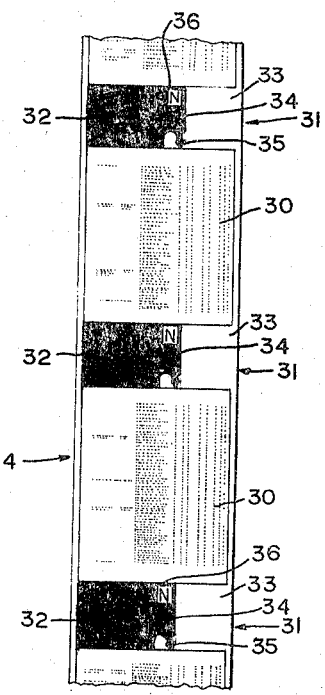
FIGURE 3 illustrates, in plan view, a short portion of a microfilm web showing information-carrying frames, constituting the primary frames of the film web and narrower indicator frames constituting supplementary frames of the film web in accordance with the principles of the invention.

The optical system for this viewing apparatus is substantially the arrangement shown at FIG. 2. The optical system 17 includes a light 20 which directs a beam through a frame of the web 14, then through a lens system 21. From the lens system, the light is turned by mirrors 22 and 23 to strike the viewing screen 12. It is to be noted that the direction of movement of the frames on the screen parallels the direction of the web 14 when mounted upon the reels 15. As illustrated, this direction, hereinafter referred to as being longitudinal with respect to the film, is preferably vertical or up and down, but it could also be horizontal or across if desired.

The frames on the microfilm web 14 are modified from conventional arrangements to incorporate herein the principles of the invention. The frames include, in alternating sequence, primary information-carrying frames 30 and secondary index-indicating frames 31. Stock market quotations appear on the primary frames 30 in alphabetical order and the individual frames, which may be as many as 500, are also arranged on the film web in alphabetical order. Accordingly, a first group of frames at one end of the web will carry information concerning companies having names starting with "A" and a final group of frames at the opposite end of the web will carry information concerning companies having names starting with "Z." The number of frames for a given starting letter will vary and there may be only one or two frames for an uncommonly used letter, such as Q or Z, while there may be 30 to 50 frames for a starting letter such as S.

It is obvious that quick location of any selected group of frames having a common starting letter is essential if the microfilm reader is to be used effectively for stock market quotations. Accordingly, the secondary frames 31 must be adapted to index or indicate the starting letters of the primary frames while the film web 14 is passing through the microfilm reader at its maximum rate of speed.

It was discovered that an easy visual method of indicating starting letters on the view screen 12 would be a transverse division of the screen into a darkly blurred region 25 at one side and a lighter region 26 at the other side, with a comparatively sharply defined vertical boundary edge 27 appearing on the screen between the two regions, the boundary edge 27 being longitudinally disposed in the direction of the film. By varying the areas of these regions, to move the boundary edge 27 transversely across the viewing screen, a regular index sequence may be established which is indicative of the various starter letters. Accordingly, a lettered indicator index strip 28 is mounted transversely across the bottom of the view screen 12 to correlate the boundary edge 27 with corresponding starting letters of the primary frames.

It was discovered that the darker region 25, the lighter region 26 and boundary edge 27 could be made to appear on the viewing screen 12 when the film was rapidly moving, if the secondary frames 31 were transversely divided into a black region 32 at one side and a clear region 33 at the other side with a longitudinally-disposed, sharply-defined edge 34 between the two regions. The respective regions 32 and 33 are varied in area in a sequential manner to shift the edge 34 across the film as from one side of the film web, as where the area of the black region 32 is a minimum, to the opposite side where the black area is a maximum. The edge 34 will produce the boundary edge image 27 on the view screen at such various positions above the letter index strip 28, and when in an extreme position where the area of the black region 32 is a minimum, the edge 34 will produce a boundary edge 27 which corresponds to an end letter of the index 28, for example, the letter A. All secondary frames 31 between the group of primary frames 30 which indicate starting letters A, are arranged in this manner, with the edges 34 in common longitudinal alignment, so when that portion of the film web is rapidly moving through the viewer, the combined effect of the commonly aligned secondary frames will produce a consistent appearance defining the edge 27 on the viewing screen at the letter A position above index 28.

Likewise, all secondary frames 31 between other groups of primary frames which indicate a common starting letter are arranged with the edges 34 in a selected common longitudinal alignment adapted to produce a consistent appearance of the edge 27 on the viewing screen at the proper letter position above the index 28. It follows that the appearance of a film web rapidly moving through the viewer is essentially a blur, with only the edge 27 being clearly defined and with the edge 27 appearing to move across the screen, as from the A position to the Z position. Slowing and stopping the film movement as the edge 27 moves in position over a given letter is a simple matter of shifting the lever 18 to a slow and stop position.

When the film web 14 is moving slowly through the viewer, the individual frames 31 will become more distinctive even though other information is blurred. For such speed, the lower inner corner of the black region 32 may be shaped to depict a pointer 35 at the edge line 34 to better indicate the proper letter on index 28 in the view screen. This pointer will be distinctive even when actual letters and other marks are blurred. A suitable letter 36 may also be formed on this secondary frame 31, and it may be sufficiently large and distinctive to be noted at speeds slower than the speed at which the pointer 35 may be seen, but at speeds which are greater than the speed at which the information on the frames 30 may be read. Such a letter is preferably located in the black region 32, but it may also be located in the light region if desired.

It is to be noted that the height of the secondary frames 31 should be a minimum compared with the height of the primary frames, if for no other reason than for the sake of economy. However, it was found that there exists definite limitations as to the minimum height of the secondary frames which could be used and still permit a distinctive boundary edge 27 to appear when the film was rapidly moving through the reader. Some variation of a practical minimum width is possible, depending upon the manner in which information is reproduced on the primary frames of the film web 14, such as with black printing and clear background, as illustrated, or with clear printing and a black background, as is commonly used in microfilm work. In either instance, it was found that the height of the secondary frames should be at least approximately 30 percent of the height of the primary frames, with approximately 25 percent being a reasonable minimum. Where there is a substantial variation in the amount and arrangement of information on the primary frames, this height of the secondary frames may have to be greater and even as much as 50 percent of the height of the primary frames under extreme conditions. Once, however, it is realized that the proportion of the height of the secondary frames must be approximately 30 percent that of the primary frames, a skilled craftsman, with very few tries, can determine the best proportions to use.

Figure 4:
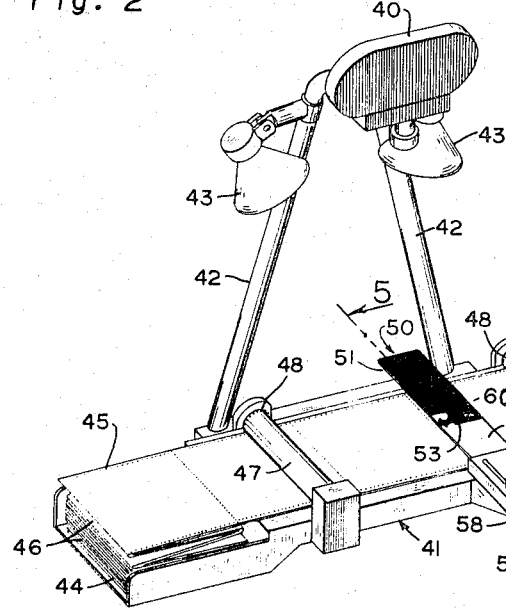
FIGURE 4 is a perspective view of microfilm photographing apparatus adapted to photograph information carried upon a continuous web of paper and to simultaneously photograph a primary and secondary frame.
Figure 6:
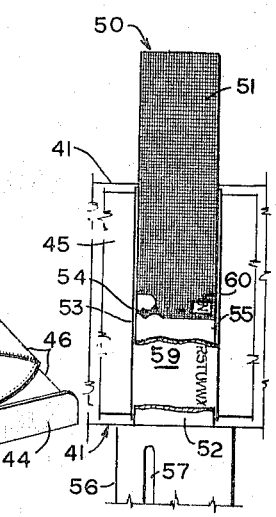
FIGURE 6 is a fragmentary portion, partly in section, of overlapping members shown in FIG. 5, as taken from the indicated line 6—6 at FIG. 5, but on a further enlarged scale.
Figure 5:
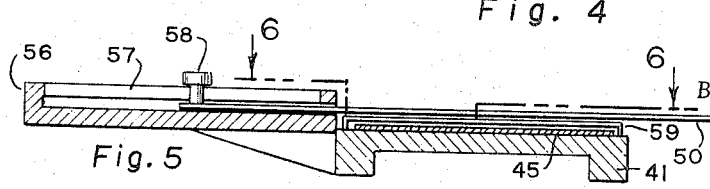
FIGURE 5 is a transverse sectional view of a portion of the apparatus illustrated at FIG. 4, as taken from the indicated line 5—5 at FIG. 4, but on an enlarged scale, and with the components being distorted in thickness for purposes of clearer illustration.

FIGURES 4, 5 and 6 illustrate one preferred type of apparatus for taking microfilm pictures of original data to produce the microfilm web 14. A camera 40 carries the web 14, or the negative of the web from which it is produced. This camera is mounted over a photographic bed 41 as upon a pair of legs 42 to be directed towards the bed. Lights 43 are also carried upon the legs 42 to illuminate material placed thereon.

The bed preferably includes opposing end trays 44 which are especially adapted to hold, dispense and receive a paper web 45 having the stock market quotations printed thereon, either continuously or in selected panels. Paper webs of this type, approximately 12 inches wide, are ordinarily accordion-folded, as at 46, and the trays are especially useful for this type of folding. Such webbing is also conventionally furnished with perforated edges, and guide rolls 47 having sprockets 48 at the edges may be mounted over the ends of the bed 41 to facilitate movement of the web in its proper path and to accurately gage the intervals between panels of material typed on the web for shifting the web from one photo panel to the next.

It is contemplated that a primary frame 30 and a secondary frame 31 will be photographed simultaneously and the camera 40 will be set to accomplish this. The primary frame will constitute a photograph of material on a selected panel or reach of the web 45, and the secondary frame will constitute a photograph of a gage strip 50 which overlies the web 45 adjacent to the primary-frame panel portion. This gage strip 50 is transversely disposed over the paper web 45 and has a width sufficient to provide the desired height of the secondary frame in the final photograph. In its simplest form, the gage strip 50 may constitute a flat sheet of paper having a black region 51, a white region 52, and a boundary edge 53. It may further include the outline of a suitable pointer 54 and an indicator letter 55. Proper placement of the strip over the web 45 will produce the desired photograph of a primary and secondary frame.

The preferred construction of this gage strip 50, as illustrated, includes a slotted frame portion carried as a side extension socket 56 on the bed 41 wherein the strip 50 is slidably fitted. The length of the strip and the depth of the socket 56 are such that the edge 53 may move completely across the paper web 45 to permit proper positioning of the edge 53 for any given index letter. A slot 57 is formed in the extension socket 56 from whence a finger button 58 projects. This finger button 58 is connected to the strip 50 to facilitate moving it into and out of the extension socket 56 and across the web. A lettering index may be formed on the socket 56 adjacent to the slot 57 to facilitate positioning the strip 50 for a selected index letter.

In order to provide for a letter 55 at each selected position of the strip 50, the letter 55 may be one of a series printed upon a transversely-disposed sheet 59 underlying the strip 50 and bridging the web 45 as in the manner illustrated at FIGS. 5 and 6. A window 60 is formed in the strip 50 above the letters of the series on the sheet 59, and it follows that as the strip 50 is shifted from one letter-indicating position to another, the shifting of the window exposes the proper letter 55 for each position. This renders the reproduction of the date of the web 45 and of the properly positioned strip 50 onto the film web 14, or its negative, a very quick and simple matter.

While I have now described my invention in considerable detail, it is obvious that others skilled in the art can build and devise alternate and equivalent arrangements and operations which are nevertheless within the spirit and scope of my invention. Hence, I desire that my protection be limited, not by the constructions illustrated and described, but only by the proper scope of the appended claims.

I claim:

1. Apparatus adapted to photograph data compiled on paper sheets in an alphabetical order onto a film for microfilm viewing, including in combination therewith:
   (a) a camera having means to photograph a pair of frames simultaneously;
   (b) a base having means to encompass a two-frame view of the camera and to hold a sheet of compiled data at a first frame portion on the base and having a transversely disposed alphabetical index indicator associated with the second frame portion; and,
   (c) a transversely disposed gage strip extending across the base having means to cover the said second frame portion thereof, said pad having a dark area at one side and a light area at the other side, and a longitudinally disposed dividing edge between the areas, and having means shiftable transversely across the base, whereby to position the dividing edge at a selected transverse position according to said alphabetical arrangement to correlate the dividing edge with said arrangement and with the proper index of a data sheet placed on the other frame portion.

2. In the apparatus defined in claim 1, including a side socket wherein said gage strip extends, a slot in the socket and a finger button attached to the gage strip and extending through the socket and wherein said alphabetical arrangement is located on said gage strip adjacent to the slot.

3. In the apparatus defined in claim 1, wherein said paper sheets are joined together as a continuous web, with the web extending underneath said gage strip and adapted to hold the web at each end of the base.

4. In the apparatus defined in claim 1, including a window in the gage strip adjacent to the dividing edge, a fixed transversely disposed indexing sheet on the base underlying the gage strip and a transverse row of letters thereon aligned with the gage strip window, whereby shifting of the gage strip to a selected position exposes a selected letter.

References Cited

UNITED STATES PATENTS

| | | | |
|---|---|---|---|
| 2,761,351 | 9/1956 | Gehring et al. | 88—24 |
| 3,094,034 | 6/1963 | Eagle et al. | 88—24 |
| 3,195,399 | 7/1965 | Jonker | 88—24 |
| 3,212,395 | 10/1965 | Bailey | 88—24 |
| 3,220,301 | 11/1965 | Koonz et al. | 88—24 |
| 3,267,800 | 8/1966 | Baillod | 88—24 |

NORTON ANSHER, *Primary Examiner.*

R. A. WINTERCORN, *Assistant Examiner.*